B. C. FRAZIER.
COUNTERBALANCING HOOK.
APPLICATION FILED MAR. 21, 1919.

1,313,807.

Patented Aug. 19, 1919.

Inventor
B. C. Frazier
By Franklin N. Hough
Attorney

UNITED STATES PATENT OFFICE.

BERT CYRUS FRAZIER, OF WICHITA, KANSAS.

COUNTERBALANCING-HOOK.

1,313,807.      Specification of Letters Patent.      Patented Aug. 19, 1919.

Application filed March 21, 1919. Serial No. 284,055.

*To all whom it may concern:*

Be it known that I, BERT C. FRAZIER, citizen of the United States, residing at Wichita, in the county of Sedgwick and State of Kansas, have invented certain new and useful Improvements in Counterbalancing-Hooks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in hooks for supporting bunches of bananas and consists of a simple and efficient device of this nature so arranged that a loop of cord tied to the bunch of bananas may be easily removed as the weight of the bunch is relieved from the hook.

My invention consists of a simple and efficient device of this character, having various details of construction, combination and arrangement of parts which will be hereinafter fully described, shown in the accompanying drawings and then specifically defined in the appended claim.

I illustrate my invention in the accompanying drawings which, with the letters of reference marked thereon, form a part of this application and in which.

Figure 3:
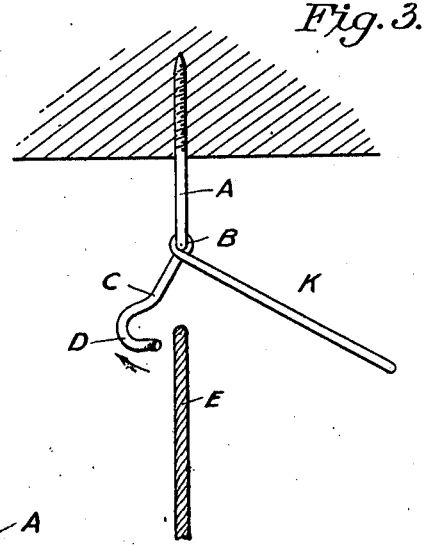
Fig. 3 is a detail view showing the manner of disconnecting the loop from the hook.
Figure 4:
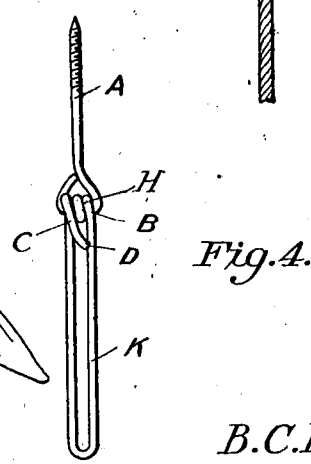
Fig. 4 is a detail perspective of the weighted hook.

Reference now being had to the details of the drawings by letter:

A designates a screw which is adapted to be screwed into the ceiling of a room or other suitable place, and has an eye B at one end. A hook C has its end D bent slightly laterally in order to facilitate the catching of the loop E over the same and which loop is attached to a bunch of bananas F, or other object to be supported thereby. The shank portion of the hook as shown clearly in Fig. 4 of the drawings, is twisted to form a coil H which is pivotally-mounted in the eye B and is thence bent forward and upon itself, forming the counterweighted portion K, which will overbalance the hook and when weighted is relieved from the hook and the latter will turn to the position shown in Fig. 3 of the drawings and be automatically released from the hook E.

Figure 1:
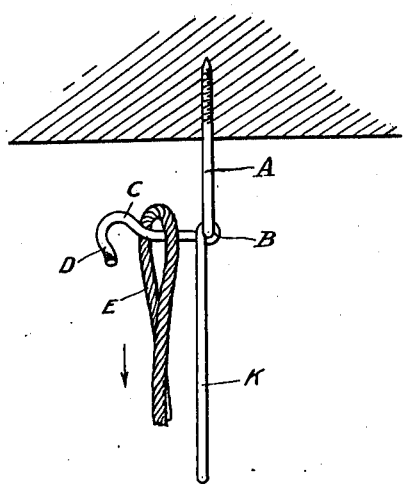
Figure 1 is a view showing the loop about to be connected to the hook.
Figure 2:
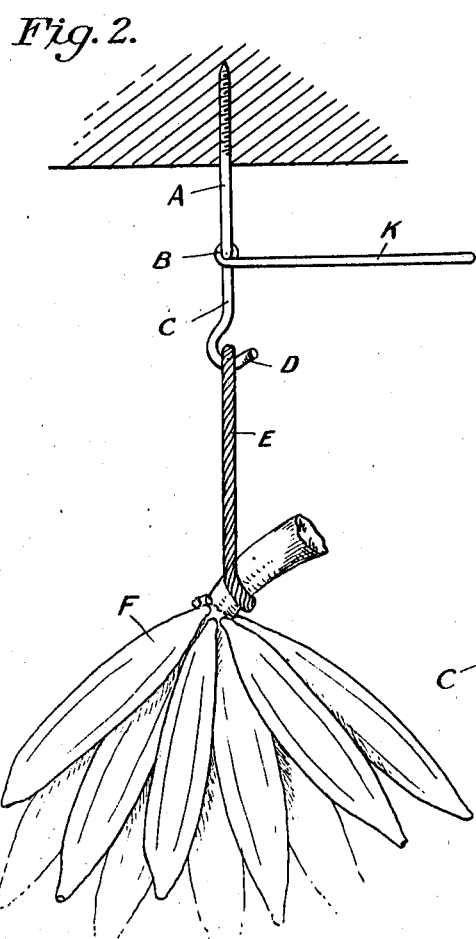
Fig. 2 is a view showing the bananas supported by the hook.

In connecting the loop, the latter is caught over the hook in the manner shown in Fig. 1 of the drawings and the hook tilted under the weight of the object to be supported, and as the hook tilts down, the laterally extending ends of said hook will cause the hook to engage the loop in the manner shown in Fig. 2. When it is desired to release the loop from the hook it may be automatically done by relieving the hook of the weight of the object being supported, the said hook being caused to tilt to the position shown in Fig. 3 of the drawings, by reason of the counter balancing portion K.

What I claim to be new is:

A counterbalance hook for supporting bunches of bananas, etc., comprising a wire which is bent at right angles forming an eye at the angled portion thereof, one end serving as a counter weight, the other end bent to form a hook the end of which is laterally curved, said hook normally held inverted by the counterbalanced end, and over which a loop, adapted to support an object, is caught, the weight of the article being supported by and adapted to tilt the hook and the laterally curved end thereof to automatically catch into the loop as it swings down to its lowest limit.

In testimony whereof I hereunto affix my signature in presence of two witnesses.

BERT CYRUS FRAZIER.

Witnesses:
   W. G. BLACKBURN,
   B. W. BILLINGSLEY.